Sept. 16, 1941.       E. J. DUNHAM       2,256,314
                      INDUSTRIAL TRUCK
                   Filed April 14, 1939       10 Sheets-Sheet 3

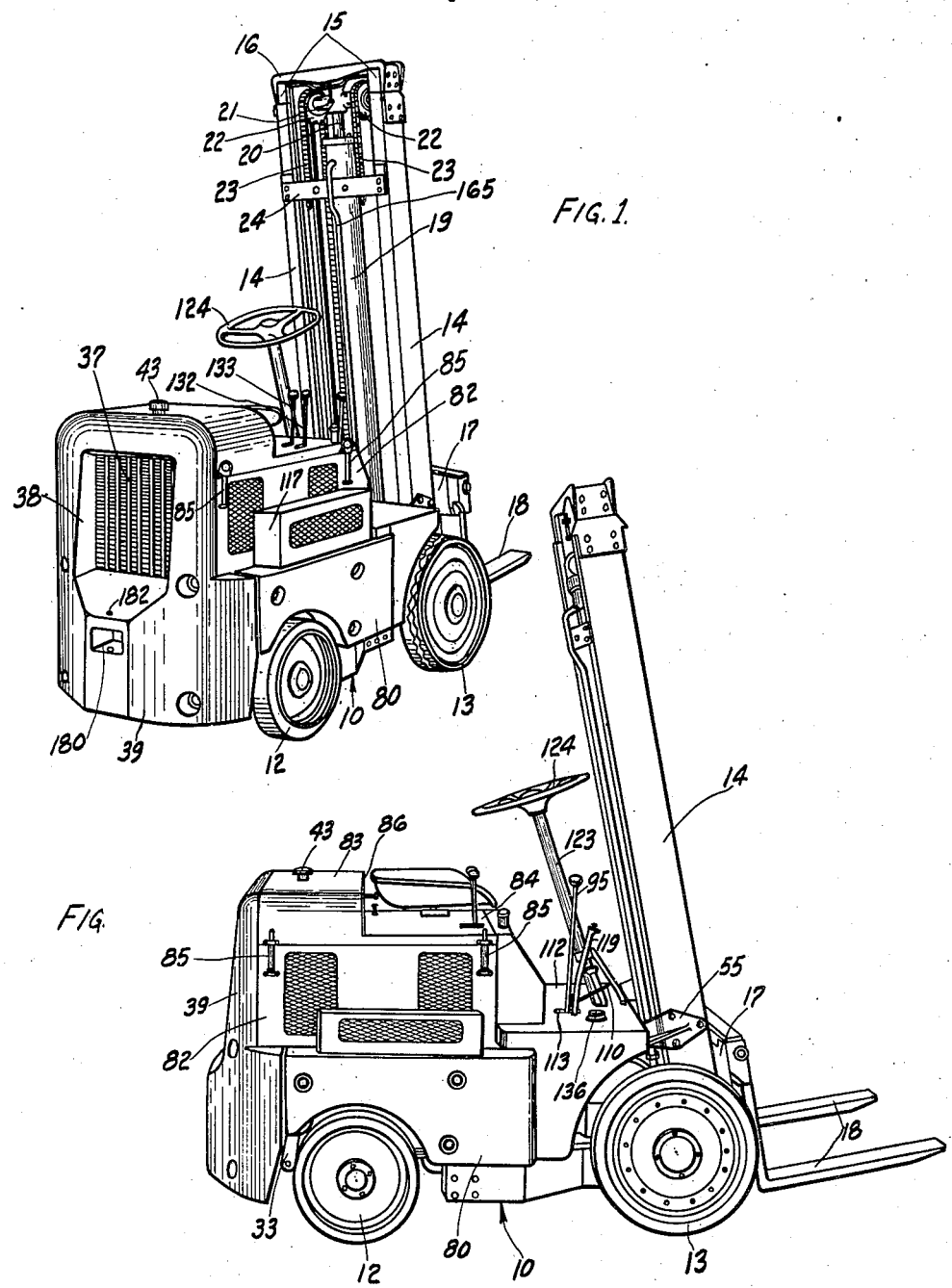

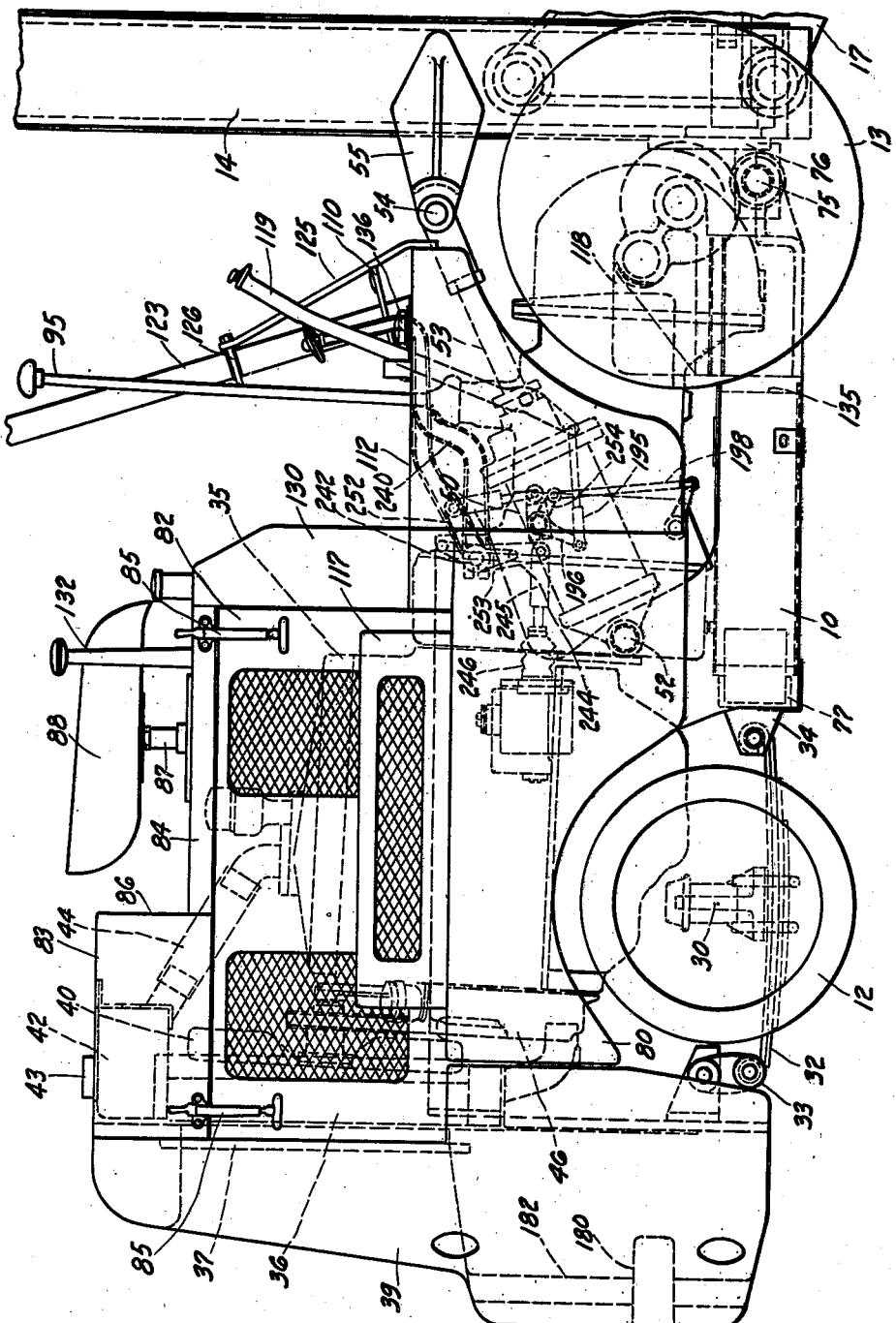

INVENTOR.
ELMER J. DUNHAM.
BY Walter E. Schirmer
ATTORNEY.

Sept. 16, 1941.  E. J. DUNHAM  2,256,314
INDUSTRIAL TRUCK
Filed April 14, 1939  10 Sheets-Sheet 4

INVENTOR.
ELMER J. DUNHAM.
BY Walter E. Schirmer
ATTORNEY.

Sept. 16, 1941. E. J. DUNHAM 2,256,314
INDUSTRIAL TRUCK
Filed April 14, 1939 10 Sheets-Sheet 6

INVENTOR.
ELMER J. DUNHAM.
BY Walter E. Schirmer
ATTORNEY.

Sept. 16, 1941.   E. J. DUNHAM   2,256,314
INDUSTRIAL TRUCK
Filed April 14, 1939   10 Sheets-Sheet 7

INVENTOR.
ELMER J. DUNHAM.
BY *Walter E. Schirmer*
ATTORNEY.

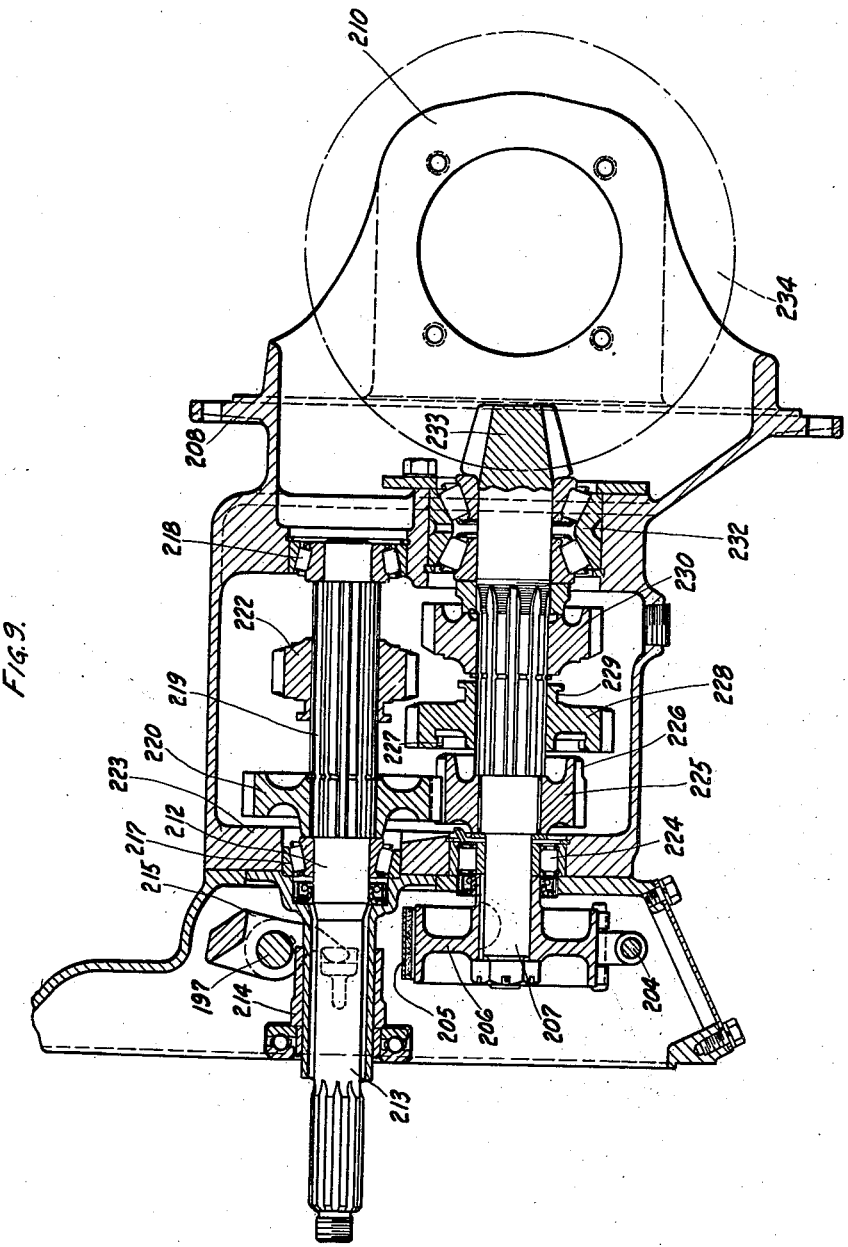

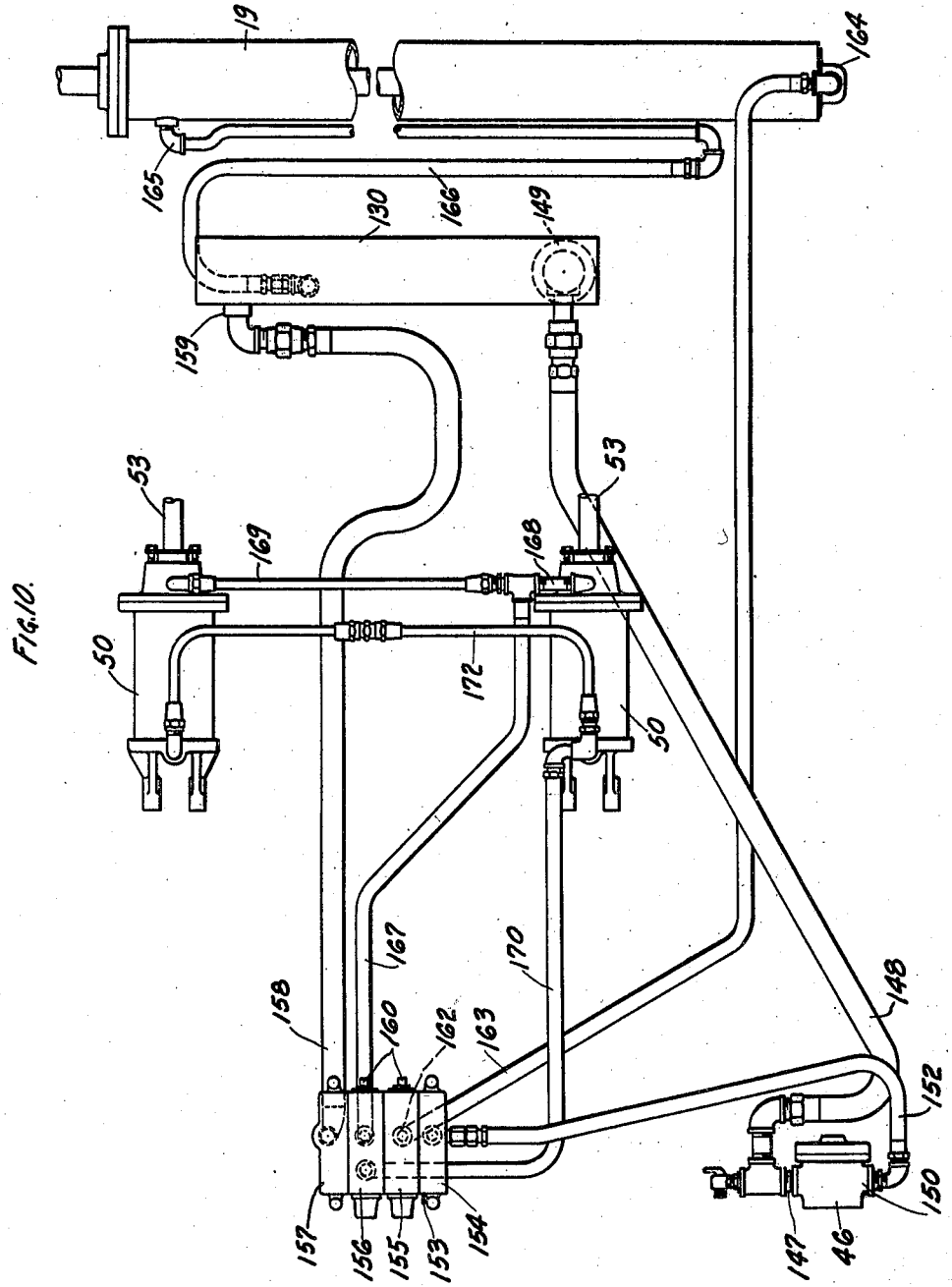

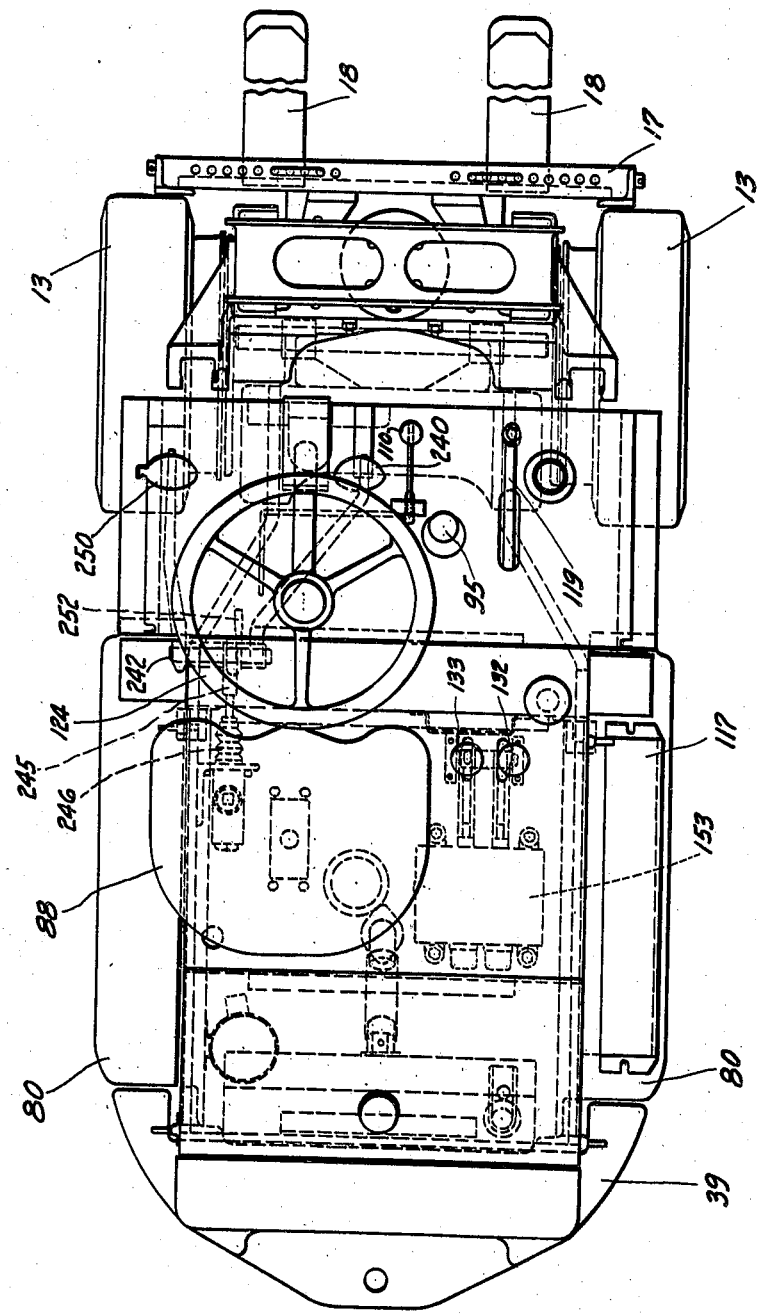

Patented Sept. 16, 1941

2,256,314

UNITED STATES PATENT OFFICE 2,256,314

INDUSTRIAL TRUCK

Elmer J. Dunham, Battle Creek, Mich., assignor to Clark Equipment Company, Buchanan, Mich., a corporation of Michigan Application April 14, 1939, Serial No. 267,749

20 Claims. (Cl. 180—54)

This invention relates to industrial trucks, and more particularly is directed to industrial trucks particularly employed for loading and unloading box cars, and for handling and tiering merchandise in warehouses, mercantile buildings, industrial plants, shipyards, and the like.

Trucks of this general type have been known for some time, but the need has arisen for a truck with a short wheel base and turning radius that could be driven directly into the doorway of a box car and turned within the width of the car to pick up or deposit material therein. To effect such a construction it has been necessary to approach the problem of manufacturing such trucks from an entirely different viewpoint.

Formerly, such trucks had the operator mounted on a platform at the rear end thereof, adjacent an instrument panel and operating mechanism by which he could control the movement of the truck and of the lifting and tiering means which is supported at the opposite end of the truck. This endangered the occupant due to his exposed position on the platform, and also materially increased the turning radius of the vehicle so that wide aisles or passageways were necessary to allow proper maneuvering of the vehicle in warehouses and the like.

However, another problem arose when it was contemplated that the wheel base and turning radius of the truck should be reduced. In effecting such a reduction of the wheel base with the load-supporting uprights or guides being mounted at one end of the vehicle, the danger of upsetting of the vehicle due to overbalancing thereof when loaded was encountered. Even if the vehicle was not upset there was the possibility that the traction of the rear steering wheels would be insufficient to allow proper control of the vehicle. Thus it was necessary that the truck be designed so that it could carry its rated capacity and appreciable over-loads, and yet be stable throughout all portions of its operating cycle. This was accomplished by the provision of counterweighting the truck chassis at points remote from the load supporting means whereby the moment arms of the counterweighting means would be sufficient to maintain the truck stable when loads were being handled with the lifting and tiering mechanism at the forward end thereof.

I also contemplated in the design of the present truck a simplification of the control system so that the operator would be more or less positioned in a manner similar to the position of the operator in a truck or automobile, with the control mechanism related to his position in such manner that highly skilled operators would not be necessary for efficient operation of the vehicle. This required the disposing of the operator in a seated position substantially centrally of the truck with pedal controls for the clutch and the brake mechanism, and with the usual type of gear shift lever similar to that used in automotive transmissions.

Still another object which has been attained by the present invention is the provision of a simplified frame and power plant assembly with the power plant in effect being a continuous rigid unit consisting of the engine, clutch, transmission and driving axle assembly all supported in a simplified frame construction, which provides proper springing of the engine unit on the rear axle and provided for proper support of the accessory equipment and accessories required in such a vehicle. This assembly problem was solved by providing for cushioned support of the power plant engine at one end of the frame, and rigid support of the rear axle assembly at the opposite end of the frame with the clutch and transmission being rigidly secured between the engine and axle assembly to form a substantially rigid backbone or spine for the vehicle. In conjunction with this the frame itself is designed to provide the pivotal support for the vertical uprights upon which the load carrying means is raised and lowered, and also provides for proper journalling of a number of the control mechanisms required for operating the vehicle. With such a design the construction lends itself well to assembly line production, since the engine, transmission, and rear axle assembly can be rigidly assembled and connected into an integral unit and readily mounted in the frame after which the accessory and auxiliary mechanisms can all be placed on the frame as it moves along an assembly line.

This simplified construction, together with the assembly line method of building the truck, has resulted in considerable economy which provides for volume production of the vehicle and thus further reduces the cost thereof. As a result, a relatively small but highly efficient truck is provided at low cost.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is a rear quarter perspective view of the completed truck;

Figure 2 is a perspective elevational view of the truck;

Figure 3 is an elevational view of the chassis and power plant assembly on an enlarged scale;

Figure 9 is a sectional view through the transmission and a portion of the drive axle assembly;

Figure 10 is a more or less diagrammatic view of the fluid circuit for controlling the raising and lowering of the load-supporting means and the tilting of this mechanism; and Figure 11 is a top plan view of the truck.

Figure 4:
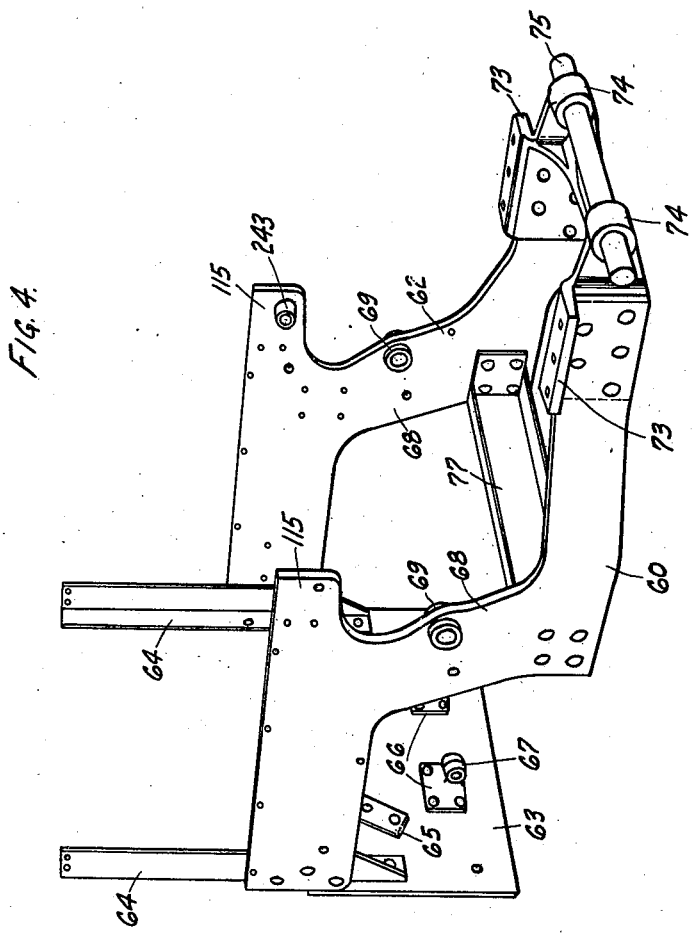
Figure 4 is a perspective view of the truck frame itself.

Referring now in detail to the drawings, the truck comprises a frame indicated generally at 10 as shown in Figures 1, 2 and 3, having the rear steering wheels 12 and the front drive wheels 13. Pivotally mounted at the forward end of the frame are a pair of vertically extending channel-shaped uprights 14 within which are telescopically mounted a second pair of uprights 15 tied together at their top by a cross member 16. Within the channels of the uprights 15 are located rollers carried by frame member 17 which forms a load supporting carriage and has the L-shaped lift fingers 18 projecting therefrom for movement under a load and to raise and lower loads placed thereon.

Mounted between the uprights is a hydraulic cylinder 19 from which projects the piston rod 20 carrying a cross-head 21 having laterally spaced sprockets 22 over which are trained chains or similar tension members 23 anchored at one end to a cross member 24 secured to the rear of the uprights 14, and which, at their opposite ends are connected to the carriage 17. With this construction, raising of the cross-head results in relative movement of the load supporting carriage 17 with respect to the uprights 15, and after the cross-head has moved upwardly a predetermined distance it abuts against the cross member 16 of the uprights 15 to move these uprights conjointly therewith while the carriage 17 moves relatively thereto to its extreme upper position, in which the uprights 15 have telescoped outwardly of the uprights 14 and the carriage has moved to the top of the uprights 15.

As shown more clearly in Figure 3, the steering axle 30 is spring supported from the truck frame by means of the longitudinally extending leaf springs 32, tied to the spring shackle 33 and to the frame brackets 34. Mounted on the frame above the axle 30 is an engine indicated generally at 35 which may be of any suitable type such as an internal combustion engine, a Diesel engine, or the like, and which has a radiator 36 disposed at one end thereof having the grill 37 protecting the same whereby air can be drawn in through the opening 38 in the rear counterweight member 39 by the fan 40 to cool the fluid in the radiator. The radiator 36 has a header 42 provided with the filler cap 43, which header has the connection 44 to the engine head of the engine 35.

Mounted at the front end of the engine 35, which it will be noted is mounted in reverse position on the truck frame, is a fluid pump 46 driven from the crankshaft of the engine and adapted to supply the fluid under pressure which operates the raising and lowering cylinder 19, and also operates tilting cylinders 50 trunnioned at their rear ends as indicated at 52 on the truck frame and having axially extending piston rods 53 pivotally connected as indicated at 54 to brackets 55 carried adjacent the lower portions of the uprights 14. The uprights being pivotally mounted on the frame, admission of fluid under pressure to opposite ends of the cylinders 50 results in forward or rearward tilting of the uprights about their pivots to correspondingly tilt the load supporting carriage 17.

Figure 5:
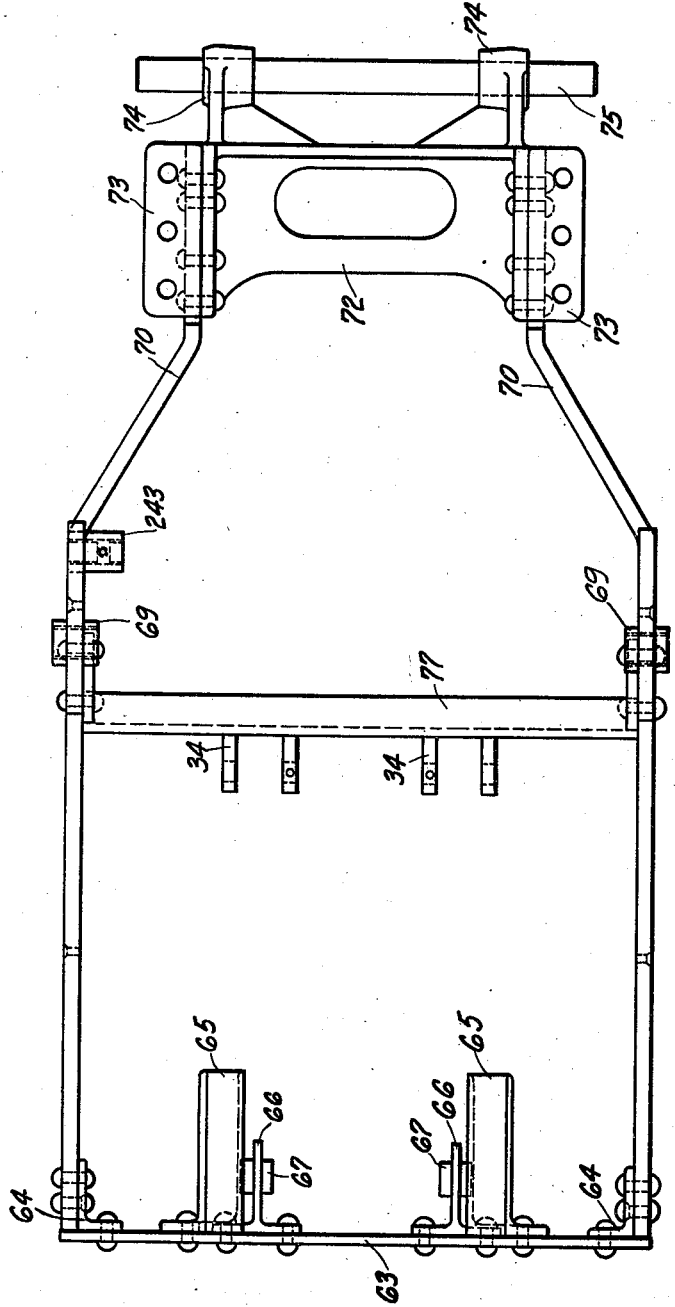
Figure 5 is a bottom plan view of the truck frame shown in Figure 4.
Figure 6:
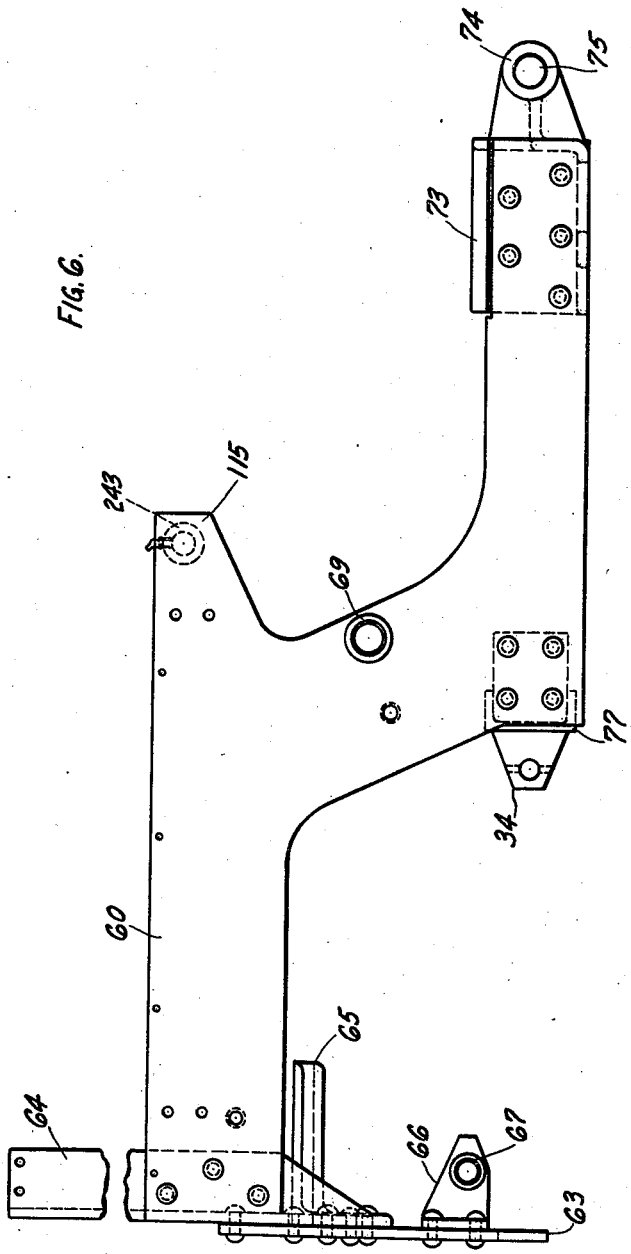
Figure 6 is an elevational view of the truck frame shown in Figures 4 and 5.

Considering now in detail the construction of the frame 10, which is shown in Figures 4 to 6, inclusive, this frame comprises two side members 60 and 62 which are joined together at their rear end by a transversely extending plate 63 and carry upwardly extending angle members 64 forming the support for the radiator 36, and also the support upon which is mounted the counterweight member 39. Intermediate the angles 64 and rigidly secured to the plate 63 are two bracket members 65 which project forwardly of the plate 63 and serve as supports for the front end of the engine 35. These supports preferably are provided with rubber or similar resilient means by which the engine is secured thereto so as to provide a cushioned mounting which allows slight floating movement of the engine and yet resists the torque reactions thereof. Below the brackets 65 are disposed the two brackets 66 which have forwardly extending transverse journal portions 67 receiving the upper ends of the spring shackles 33 connected to the rear ends of the springs 32 for the steering axle 30. The frame members 60 and 62 extend substantially horizontally forwardly from the plate 63 for a distance substantially equal to the length of the engine 35 and have dropped portions indicated at 68 which are provided with the journal bosses 69 forming the trunnion supports for the trunnions 52 carrying the rear ends of the cylinders 50. Below the trunnion supports 69 the frame members again project horizontally forwardly, and converge together through angle portions 70 as shown clearly in Figure 5, and at their forward ends are connected together by a transversely extending cross member 72 which has laterally projecting support portions 73 upon which is mounted the driving axle assembly to provide a rigid support therefor.

The cross member 72 also has forwardly extending journal portions 74 through which extends the transverse shaft 75 having projecting ends upon which are mounted the pivot brackets 76 secured to the lower rear portions of the uprights 14 for pivotally supporting the uprights 14 upon the shaft 75. It will thus be apparent that the uprights 14 are pivotally supported directly on the front end of the frame construction independently of the driving axle assembly, and that the frame provides a transverse cradle at its forward end for the drive axle assembly whereby the same may be rigidly secured thereto.

A suitable cross bracing member 77 is provided adjacent the lower ends of the drop portions 68 of the frame members, and carries rearwardly extending brackets 34 forming the other pivotal connection for the springs 32.

Bolted to opposite sides of the frame 10 on the upper horizontally extending portions thereof are counterweight members which also serve as protecting fenders for the wheels 12, and which are indicated generally by the numeral 80. It will be noted that both the counterweight 39 and counterweights 80 are heavy cast iron members which are disposed an appreciable distance rearwardly of the pivotal axis of the uprights 14, and thus form effective moment arms counteracting the moment arm produced by the load on the lift fingers 18.

Above the counterweight members 80 suitable side panels 82 on opposite sides of the engine are provided for enclosing the engine, together with a hood portion 83 which encloses the radiator header 42 and has a dropped portion 84 forming a deck or the like immediately above the side panels 82 to which the latch connections 85 are secured for latching the side panels in position. Between the deck portion 84 and the hood portion 83 there is provided the vertically extending surface 86 which forms an instrument panel or the like carrying the usual instruments, such as an ammeter, oil pressure gauge, starter button and the like.

Upon the deck portion 84 at one side of the vehicle there is provided an upwardly extending post 87 which carries a seat 88 for the operator. Preferably, this seat is pivotally mounted on the post 87 and may also have a spring supported connection within the post to provide for some degree of resilience to add to the riding comfort of the operator.

Figure 7:
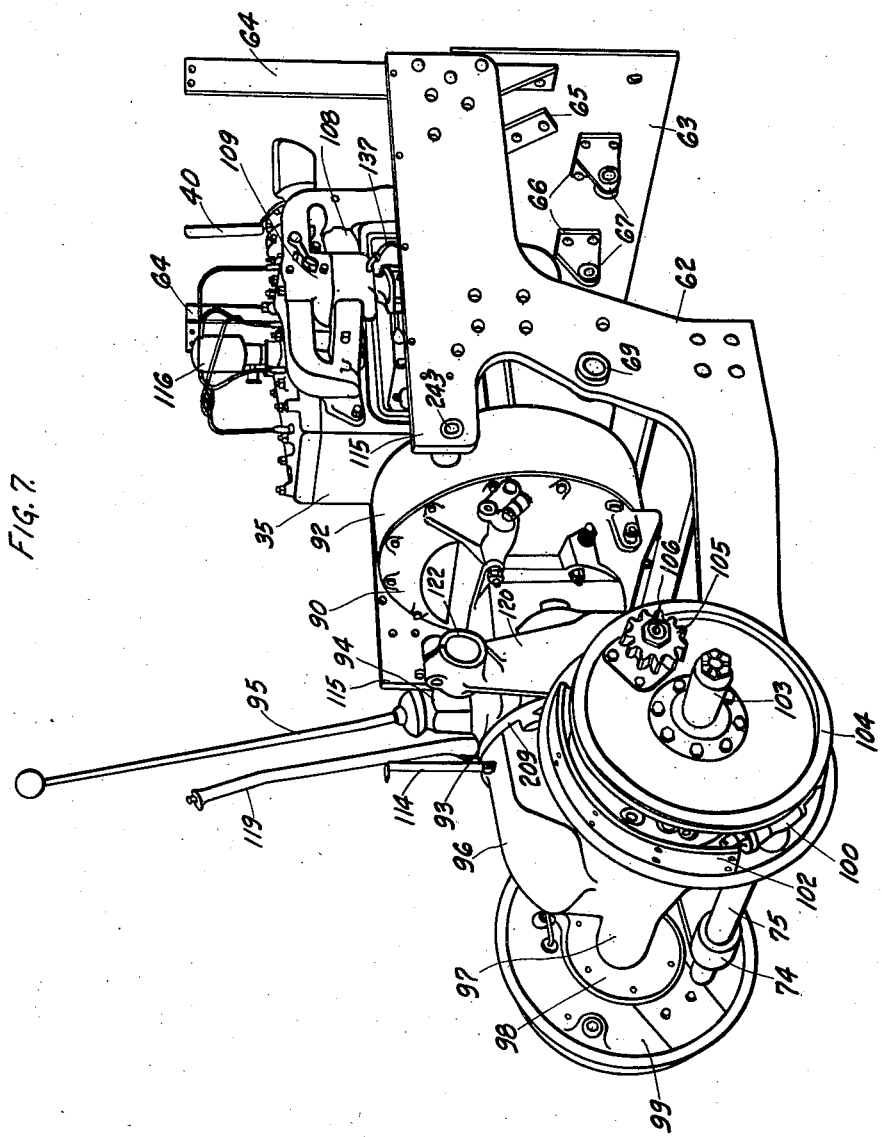
Figure 7 is a perspective view of the truck frame with the power plant assembly mounted therein.
Figure 8:
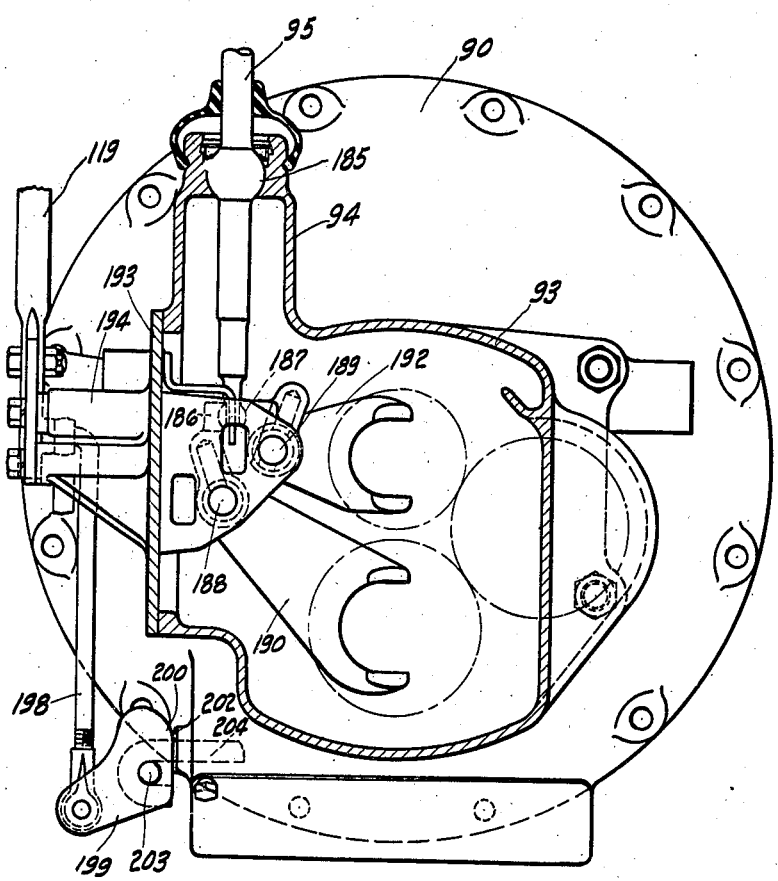
Figure 8 is an end elevational view, partly in section, of the transmission construction.

Considering now the mounting of the driving assembly within the frame 10, as clearly shown in Figures 3 and 7, the clutch housing 90 is piloted in and rigidly secured to the flywheel housing 92 of the engine 35. Bolted directly to the clutch housing 90 is the transmission case 93 having the pedestal 94 from which projects the gear shift lever 95 substantially as is customary in automotive transmissions. The details of the transmission are disclosed in Figures 8 and 9, and will be described hereinafter. Bolted directly to the rear face of the transmission housing 93 is an axle and differential carrier assembly 96 which has oppositely extending housing arms 97 having flanges 98 to which are bolted the backing plates 99 carrying the brake assemblies for the driving wheels. Preferably, these brake assemblies comprise hydraulically actuated brakes comprising the brake cylinders 100 and the brake shoes 102. Projecting outwardly through the backing plate are the jack shaft or stub shafts 103 upon which the wheels 13 are pivotally mounted, and a suitable separator plate 104 is provided between the brake assembly and the internal driving gear assembly comprising the ring gear carried by the wheels 13 and the pinion gear 105 mounted on a shaft 106 extending into the housing 96 through the differential case. The axle assembly is substantially identical with that disclosed in my Patent No. 2,134,687, issued November 11, 1938. The only difference between the present axle construction and that shown in the aforesaid patent is that the uprights in the patent are pivotally mounted on the housing arms 97, whereas in the instant application the uprights are mounted on the forward end of the frame to pivot on the shaft 75.

As shown clearly in Figure 7, the engine 35 is provided with the usual manifold construction 108 including a carburetor 109, which is controlled from a suitable foot accelerator pedal 110 mounted on the flood board 112 of the vehicle. This floorboard 112 has a suitable opening 113 therein through which extends the gear shift lever 95, and it will be noted that the housing 96 has an upstanding arm 114 forming a forward support for the floorboard 112 which, at its rear end, is supported on the forward end portions 115 of the frame.

The engine 35 is also provided with the usual ignition system, including the high tension coil 116, and is supplied with current from a battery enclosed within the housing 117 mounted on the top of one of the counterweight members 80.

It will be apparent with this construction that the engine, clutch, transmission, and driving axle are all rigidly connected together to form a rigid driving assembly from the engine to the axle, which acts as a backbone for taking care of the torque reactions and provides a very close coupled construction materially reducing the wheel base of the truck, which is highly desirable.

The housing 96, as shown in Figure 3, has bracket portions 118 adjacent the shafts 106 which are adapted to lie upon the portion 73 of the frame and to be bolted thereto for rigidly connecting the frame and drive assembly together. These brackets may be formed integral with the housing 96 or secured thereto in any desired manner, and it is apparent that adjustment between the driving assembly and the frame can be provided by shims placed between the supporting surfaces 73 and the brackets to cover any possible inaccuracies between the frame and the driving assembly.

The floorboard 112 also has projecting therethrough the hand brake lever 119 which is connected in a suitable manner to be described hereinafter to a brake construction provided on the countershaft of the transmission.

At one side of the junction between the transmission housing 93 and the differential housing 96 there is provided a vertically extending bracket 120 having a transverse journal portion 122 at its upper end formed as a split clamp member in which is adapted to be secured the steering mechanism of the vehicle, and which forms a support for the upwardly and rearwardly extending steering post 123 at the upper end of which is mounted the steering wheel 124. A suitable bracket 125 is bolted to the forward end of the floorboard, and has a collar portion 126 engaging about the post 123 to rigidly hold the same in position. From the steering mechanism supported in the bracket 125 a suitable drag link connection is provided to the steering apparatus at the axle 30. This apparatus may be of the type shown in detail in my copending application, Serial No. 244,945, filed December 10, 1938, in which overlapping tie rod sections are secured to the steering knuckles of the two wheels 12, and are carried by a crank plate which has an offset arm portion to which is connected the drag link actuated by the steering mechanism. With such a construction, a differential steering action is provided and the wheels 12 are so connected by the tie rods that a very sharp turning action can be imparted thereto so that the truck will pivot about a point laterally adjacent one of the driving wheels 13.

Mounted between the floorboard 112 and the forward end of the deck 84 is an oil reservoir 130 which contains the oil for the fluid pump 46, and from which such oil is withdrawn by the pump to be transmitted under pressure to the cylinders 50 and 19. Suitable control valve means is provided, as will be described hereinafter, which are actuated by the respective control levers 132 and 133 extending upwardly through suitable slots in the deck 84. The control levers 132 and 133 are therefore disposed laterally adjacent the seat 88 within convenient reach of the operator, and are moved fore and aft to control raising and lowering of the load-supporting carriage 17 and tilting of the uprights 14.

Disposed below the flywheel housing and transmission of the vehicle, and supported between the diverging portions 70 of the frame is a gas tank indicated generally at 135, which has a filler extension projecting upwardly and laterally to one side of the transmission 93 with a filler opening and cap 136 projecting above the floorboard 112 adjacent the hand brake lever 119. From the tank 135 the gasoline is transmitted to the carburetor 109 by means of a suitable gas pump through the conduit 137 which, as shown in Figure 7, projects upwardly within the frame member 62 into the carburetor.

Considering now in detail the fluid circuits for operating the tilting and lift cylinders, this is shown in detail in Figure 10.

The pump 46 has its inlet side 147 connected through the conduit 148 with the bottom reservoir well 149 at the lower end of reservoir 130. From the outlet side 150 of the pump, the high pressure line 152 leads to a series of valves, indicated generally at 153. The high pressure line is connected to the first valve body 154 which includes a safety by-pass valve set at a predetermined pressure so that if the pressures in the line exceed this amount the oil is by-passed past the lift valve body 155 and the tilt valve body 157 connected through the conduit 158 to the top of the reservoir 130, as indicated at 159. Each of the valve bodies 155 and 156 has a control plunger such as indicated at 160, which is connected through suitable links to the control levers 132 and 133. The lift valve has a single outlet 162 connected through the conduit 163 to the lower end 164 of the lift cylinder 19. When the control lever 132 is actuated, fluid under pressure from the pump is transmitted through the valve 155 to the line 163 and into the lower end of the cylinder 19, whereupon the cross-head 21 is raised to effect raising of the load-supporting carriage. The upper end of the cylinder 19 has an overflow line 165 which allows any oil above the piston in the cylinder 19 to flow outwardly therefrom, and thence back through the line 166 to the reservoir 130. The load-supporting carriage is lowered by gravity when the pressure on the under side of the piston 19 is relieved.

The tilt valve 156 is of a construction such that actuation of the plunger in one direction from a neutral position connects the high pressure side of the oil line to the conduit 167, from which conduit the oil is transmitted through the branch lines 168 and 169 to the corresponding forward ends of the tilt cylinders 50. This results in pressure being applied against the pistons within the tilt cylinders moving the piston rods 53 rearwardly in the cylinders to tilt the uprights 14 rearwardly. When the control lever 133 is moved in the opposite direction past neutral position, the oil under pressure is allowed to flow through the valve 156 into the conduit 170 which has the branch connection 172, so that under such conditions the oil under pressure is supplied to the rear ends of the tilt cylinders 50 moving the piston rods 53 outwardly to tilt the uprights 14 forwardly.

The control levers 132 and 133 are spring controlled to normally remain in neutral position, under which conditions the oil forced out of the pump 46 flows from the valve body 154 to the valve body 157 and thence back into the reservoir 130, thereby providing a continuous circulation of this oil in what might be termed an idling operation of the system. When either of the valves 155 or 156 is actuated, the oil under pressure is directed to the corresponding cylinder, and when the piston in the respective cylinder reaches a limiting position, the safety valve in the valve body 154 releases to allow by-passing of the oil so that no undue pressures are built up in the cylinders. The release of this safety valve is audible, and indicates to the operator that a limiting position has been reached. If at any time during the operation of either of the valves the control lever connected thereto is released, the lever immediately moves to neutral position, stopping the mechanism and holding the uprights or the load carriage in its stopped position. Thus, the uprights can be tilted to any intermediate position and the load-supporting carriage can be raised any desired amount between its upper and lower limits and held in position without requiring any further action on the part of the operator. Also, a safety feature is provided inasmuch as the operator cannot set either of the control levers for operation and leave the machine, or release the control lever as it immediately will return to neutral position, thus preventing any possibility of starting movement of the load-supporting carriage and then leaving the machine while such movement continues.

By the locating of the control valves 132 and 133 immediately adjacent the operator, it is possible for the operator to actuate these members and have clear vision as to the movement of the load-supporting mechanism so that moving of the load can be accurately controlled. Further, the operator sitting intermediate the ends of the vehicle is fully protected against injury from surrounding objects, and is in a position where a clear view can be had for guiding the vehicle through narrow aisles, into and out of freight cars, along docks, and the like.

It will be noted that the counterweight 39 which hangs over the rear end of the vehicle is of a rounded form, which materially adds to the appearance of the vehicle and also prevents possible injury that might be caused by sharp corners or the like. This counterweight is preferably provided with a recess, as indicated at 180 in Figure 3, adapted to receive the ball or yoke of a trailer or the like, which can be coupled to the vehicle to be towed to any desired location. A suitable vertically extending opening 182 is provided for receiving a pin to effect the coupling connection.

Considering now in detail the construction of the transmission and the operating mechanism therefor, the transmission housing 93 is piloted on and secured to the clutch housing 90. The transmission housing includes the pedestal 94 having the spherical supporting seat 185 for the gear shift lever 95. This provides universal support for the shift lever to allow it to have rocking movement laterally for selective engagement with the shift forks 186 and 187 which are connected to the shift rails 188 and 189, respecclosely adjacent to the control levers 132 and 133 to facilitate their operation, and also to render them readily accessible for inspection or repair. The same is true of the other operating parts of the vehicle as the entire design is constructed with the thought of accessibility to the working parts by removable panels, such as the panels 82 or the removable floorboard and hood assembly.

The vehicle is also capable of use as a tractor, and can be simultaneously employed as a tractor and a truck with little or no difficulty.

The operation of the cylinder 19 for raising and lowering carriage 11 and telescoping movement of the uprights is substantially the same as described in detail in my copending application, Serial No. 211,746, filed June 4, 1938.

It is to be noted that the truck herein shown and having a capacity of 1½ to 2 tons moved on the lift fingers, is so designed as to have a wheel base of only 38 inches and has an over-all length of less than 100 inches from the rear counterweight to the tips of the lift fingers.

It is also to be understood that the machine can be built without the second set of telescoping uprights 15 for use in cases where extreme tiering height is not desired, with a consequent simplification of the mechanism, or it can be built with relatively low uprights telescoping so as to secure a relatively high lift, but when in lowered position extending only to a height below the level of the operator's head.

I am aware that a number of changes can be made in certain details of the assembly herein shown and described, and I therefore do not intend to be limited except as defined by the scope and spirit of the appended claims.

I claim:

1. In an industrial truck having a rigid power unit assembly, a frame comprising parallel side members spaced apart at one end by a transverse vertical plate and at the opposite end by a transverse cradle, forwardly extending projections on said cradle, a transverse shaft supported in said projections, supporting means on said plate and cradle adapted to receive opposite ends of said rigid power unit assembly, and counterweight means secured to said end plate and the adjacent side members about said engine end of said frame.

2. A frame and power unit assembly for an industrial truck comprising parallel side frame members spaced apart at one end by a transverse vertical plate and having dropped opposite ends spaced apart by a transverse cradle, an intermediate transverse member, spring supports secured on said plate and intermediate member, engine support brackets on said plate above said spring supports, a transverse shaft carried by said cradle forwardly of the ends of said side frame members, supporting pads carried by and extending laterally outwardly of the cradle, and a power unit assembly comprising an engine, transmission, and drive gearing coupled together as a rigid unit, said drive gearing portion of said assembly being mounted on said pads and said engine being supported on said engine support brackets.

3. A frame and power unit assembly for an industrial truck, said frame comprising a pair of side members spaced apart at one end by a transverse vertical plate, said side members extending downwardly and forwardly at their opposite ends to provide a dropped forward frame portion spaced apart by a transverse cradle member having support pads laterally overlapping said ends, said cradle member having forwardly extending journals supporting a transverse cross shaft and bracket means on said plate adapted, with said pads, to support said power unit assembly in said frame.

4. A frame and power unit assembly for an industrial truck comprising a rigid frame including laterally spaced side members spaced at one end by a transverse plate and at the opposite end by a transverse cradle, said cradle having horizontal pads at the ends thereof, brackets extending inwardly from said plate, a power unit comprising a motor, a transmission piloted in and secured to the fly-wheel housing thereof, and a drive axle assembly rigidly secured to said transmission and including a differential housing disposed in said cradle, said housing having support on said pads and said motor having support on said brackets.

5. In combination, a power unit comprising an engine, a transmission and a drive axle assembly coupled in line as a rigid unit, a pair of driving wheels carried by said assembly, a steering axle, a frame resiliently supported at one end on said axle and at the opposite end secured to said drive axle assembly, said frame including side members laterally enclosing said engine and extending forwardly and downwardly and converging inwardly beneath said axle assembly and intermediate said wheels, a plate extending between said side members forwardly of the engine and having means supporting the engine thereon, and a transverse cradle beneath said axle assembly and secured to said converging ends of said side members, said cradle having means securing the same to said assembly.

6. In combination, a power unit comprising an engine, transmission and drive axle assembly secured together as a rigid unit, a steering axle beneath said engine, a frame resiliently supported on said steering axle at one end and secured to said drive axle assembly at the opposite end, an operator's seat supported on said frame above said engine intermediate said axles, a steering post extending diagonally forwardly from said seat toward said drive axle assembly and having a connection from the lower end thereof to said steering axle.

7. The combination of claim 6 further characterized in that said frame includes a transverse rear plate having means for supporting the front end of said engine, and a radiator mounted on the inner face of said plate above the engine supporting means.

8. In combination, in an industrial truck, a power unit assembly comprising an engine, transmission and drive axle assembly rigidly coupled together, a frame comprising two side members disposed on opposite sides of said unit, a transverse cradle at one end of said frame secured to said drive axle assembly, a transverse vertical plate connecting the side members at the opposite end of the frame, engine support means on said plate, a steering axle beneath said engine, means resiliently supporting said frame thereon, a counterweight mounted on said plate, and counterweights secured to said side members and extending longitudinally from said first weight substantially to the transverse plane through the front end of said transmission.

9. The combination of claim 8 further characterized in the provision of a hood for said engine, said first counterweight extending vertically above said hood and having an opening tively, carrying the shifter yokes 190 and 192. Suitable detent means is provided for holding the shift rails in selected shifted position.

The shift mechanism is carried on a plate member 193 bolted to the side face of the transmission housing and having an outwardly projecting bracket portion 194 forming a support for the hand brake mechanism actuated by the hand brake lever 119. This mechanism, as shown more clearly in Figure 3, includes a connecting link 195 which is pivotally connected between the lower end of the hand brake lever and a bell crank member 196 pivotally mounted on the clutch shaft 197 projecting out of the side of the clutch housing. The opposite end of the bell crank lever 196 has a link 198 pivotally connected thereto and at its opposite end connected to a pair of cam members 199 which have bearing surfaces 200 engaging a boss 202 formed on the side wall of the transmission housing. Connected to the pivot 203 of the cam levers 199 is a J bolt member 204 which extends transversely into the transmission and serves as a means for clamping the brake band 205 about the brake drum 206 carried by the countershaft 207 of the transmission. This brake construction is similar to that disclosed in Leo A. Bixby patent, No. 2,090,100, issued July 17, 1937.

The transmission has bolted to the rear flange 208 thereof the bell flange 209 of the differential housing 96. Extending rearwardly from the flange 208 the transmission has a differential carrier including the journals 210 for supporting the differential case. The main shaft 212 of the transmission is formed integral with the clutch shaft, and has an intermediate reduced portion 213 upon which is mounted the clutch throwout bearing 214 controlled by the clutch rocker arm 215 mounted on the shaft 197. Suitable bearings 217 support the intermediate portion of the shaft 212, and at its rear end the shaft is supported by the tapered bearings 218. The splined portion 219 of the shaft is adapted to carry an axially fixed gear 220 and an axially slidable gear 222, the latter gear being controlled by the shifter yoke 192.

The countershaft 207 of the transmission has bearing support in the transverse partition 223 between the clutch housing and the transmission housing by means of the bearings 224 and has rotatably journalled thereon the gear 225 which is in constant meshing engagement with the gear 220 of the main shaft. The gear 225 has clutch tooth portions 226 thereon adapted to be engaged by the internal clutch teeth 227 of an axially shiftable gear 228 carried on a splined portion of the countershaft. The gear 228 has a shift collar 229 thereon adapted to be engaged by the shifter yoke 190 for axial shifting movement.

Also splined on the shaft 207 rearwardly of the gear 228 is the gear 230 which meshes with an idler gear on a lay shaft that is adapted to be engaged upon rearward axial shifting of the gear 222 to provide for reverse movement of the truck. Suitable double tapered bearings 232 support the pinion end of the countershaft 207, and the pinion 233 projects rearwardly and has meshing engagement with a ring gear diagrammatically shown at 234 carried by the differential case supported in the journals 210.

It will be apparent that with this transmission construction two speeds forward and one reverse are provided. The first forward speed is produced by meshing engagement between the gear 222 and the gear 228, while second speed is produced by engaging of clutch teeth 227 of the clutch tooth portions 226 of the gear 225. Reverse speed is produced by shifting the gear 222 away from the gear 220 into meshing engagement with the idler gear which drives the gear 230.

The provision of the band brake 205 for the brake drum 206 carried on the countershaft is necessary by reason of the use of hydraulic brakes on the drive wheels, since a parking or emergency brake is necessary to hold the vehicle from moving when parked on grades or the like. The pedal 240 shown in Figure 11 constitutes a brake pedal which is rotatably journalled on a shaft 242 rotatably supported in the journal portion 243 of the frame 10, as shown in Figures 4 to 7, inclusive. The brake pedal, as shown more clearly in Figure 3, has connected thereto the crank arm 244 which is pivotally connected to the plunger rod 245 adapted to actuate the master cylinder 246 of the hydraulic braking system. The arm 244, in effect, forms with the brake pedal a bell crank rotatably journalled on a shaft 242.

The clutch pedal 250, shown in Figure 11, has keyed connection to the shaft 242 on the outside of the frame 10, and when actuated, rotates the shaft 242 which in turn effects rotation of the arm 252 clamped to the opposite side of the shaft and projecting normally thereto. The arm 252 at its free end is pivotally connected to an adjustable link 253, which in turn is connected to the actuating arm 254 secured to the clutch operating shaft 197. Thus, upon depression of the clutch pedal the shaft 242 is rotated, which effects rotation of arm 252 and consequent rotation of the clutch shaft 197 through the link 253 in the arm 254.

It will be apparent from this explanation that the pedals 240 and 250 are located in positions similar to corresponding pedals on an automotive vehicle with the accelerator located laterally of the brake pedal 240 so that a conventional automotive type drive is effected. This, together with the location of the gear shifting lever and the hand brake, provide a construction very similar to an automotive drive so that unskilled operators can readily operate the vehicle if required to do so.

It will therefore be apparent that I have provided a very compact but highly efficient industrial truck that can be used for transporting and tiering merchandise, and is close coupled to provide a very sharp turning radius, facilitating its entry into freight cars to pick up or discharge merchandise thereinto. The construction is so designed that the counterweighting will allow relatively heavy loads to be carried on the load-supporting carriage 17 without any unstability of the truck, and the fact that these loads are carried substantially above the driving wheels insures maximum traction on slippery surfaces.

The entire mechanism is so designed as to be completely enclosed within a hood arrangement which gives the truck a well groomed appearance and prevents accidental damage to the working parts thereof. The arrangement of the oil reservoir, the gas tank, and other features of the invention are such as to use all available space within the limits of the truck frame to minimize its width and height in order that the operator shall have clear vision and maneuverability. It will be noted that the valves for controlling the operation of the tilt cylinders and the lift cylinder are located directly under the deck 84 therethrough in line with the front end of said engine.

10. The combination of claim 8 further characterized in the provision of side grilles mounted on opposite sides of the engine, said side counterweights having flat upper defining surfaces at the lower edges of said grilles.

11. In combination, a power unit comprising an engine, transmission and drive axle assembly secured together as a rigid unit, a steering axle beneath said engine, a frame resiliently supported at one end on said steering axle and secured at the opposite end to said drive axle assembly, said frame including a transverse plate at said one end for supporting the front end of said engine, a radiator mounted on the inner face of said plate above the engine supporting means, and a counterweight secured to said plate and having an opening therein in alinement with said radiator.

12. In an industrial truck having a rigidly connected engine, transmission and drive axle assembly, an enclosing frame rigidly secured at one end to said drive axle and at its opposite end supporting said engine, steering wheels for said truck resiliently connected to the engine end of said frame, an operator's seat supported on one side of said frame above the rear end of said engine, a floor board disposed above said transmission, and a steering post extending diagonally through said floor board on said side of said frame toward said drive axle assembly and connected to said steering wheels.

13. In an industrial truck having a rigid longitudinally extending power unit and drive axle assembly, an enclosing frame therefor, a support for said unit in one end of said frame, said frame having laterally spaced vertical posts above said support, a radiator mounted above said support between said posts and having a header at the upper end thereof, a vertical counterweight secured to the outer face of said frame end having an opening in line with said radiator, and side counterweights secured to said frame on the sides of said unit.

14. In an industrial truck having a rigid longitudinally extending power unit and drive axle assembly, an enclosing frame therefor, a support for said unit in one end of said frame, said frame having laterally spaced vertical posts above said support, a radiator mounted above said support between said posts and having a header at the upper end thereof, a hood for said unit having perforate side panel portions supported on said frame and a top portion extending over said unit forwardly of and below said header, and an operator's seat pivotally supported on said frame above said top hood portion at one side of the truck.

15. In an industrial truck having a rigid longitudinally extending power unit and drive axle assembly, an enclosing frame therefor, a support for said unit in one end of said frame, said frame having laterally spaced vertical posts above said support, a radiator mounted above said support between said posts and having a header at the upper end thereof, a floor board extending transversely across said frame intermediate said axle assembly and unit, an operator's seat between said floor board and header, hydraulically operated means disposed over said drive axle assembly, and a fluid reservoir for said means extending vertically from said floor board adjacent the front edge of said seat.

16. The combination, in an industrial truck having an engine, transmission and drive axle assembly rigidly coupled together with the transmission and axle assembly dropped below the engine and extending from the rear end thereof, of a frame having a transverse support at one end thereof for the front end of the engine, side frame members along the sides of said engine and terminating in downwardly offset longitudinally extending members having pad portions at their ends supporting said axle assembly thereon, a floor board extending transversely over said transmission, and an operator's seat disposed on said frame above the rear end of said engine.

17. The combination, in an industrial truck having an engine, transmission and drive axle assembly rigidly coupled together with the transmission and axle assembly dropped below the engine and extending from the rear end thereof, of a frame having a transverse support at one end thereof for the front end of the engine, side frame members along the sides of said engine and terminating in downwardly offset longitudinally extending members having pad portions at their ends supporting said axle assembly thereon, a floor board extending transversely over said transmission, a fuel tank supported between said extending members below said transmission, and a fill pipe therefor extending to said floor board at one side of said transmission.

18. In combination, a longitudinally extending rigid assembly comprising an engine, transmission and drive axle with the transmission and axle offset downwardly relative to said engine, a frame comprising a cradle at one end for supporting said axle, longitudinal side frame members on the opposite sides of and below said transmission, a cross member therebetween below said engine, vertical side plates forming a continuation of said frame members along the sides of said engine, a transverse vertical plate terminating the ends of said side plates and providing a support for the front end of the engine, and counterweights secured to said side plates and transverse plate.

19. The combination of claim 18 including a steering axle beneath said engine, and means secured to said frame resiliently supporting the same on said steering axle.

20. A frame and power unit assembly for an industrial truck comprising parallel side frame members spaced apart at one end by a transverse plate and having dropped opposite ends spaced apart by a rigid transverse member, an intermediate transverse brace between said frame members, spring supports secured on said plate and intermediate brace, a steering axle spring assembly carried by said supports, engine support brackets on said plate above said spring supports, a transverse shaft supported between said side frame members forwardly of said transverse member, and a power unit assembly comprising an engine supported at one end on said plate brackets, a transmission rigidly connected to the opposite end of said engine, and axle drive gearing connected to said transmission and rigidly secured to said transverse member.

ELMER J. DUNHAM.